(12) United States Patent
Ahern

(10) Patent No.: US 7,320,298 B1
(45) Date of Patent: Jan. 22, 2008

(54) CHARGED WATER FUMIGATION FOR COMBUSTION SYSTEMS

(76) Inventor: Brian Steven Ahern, 94 Houghton La., Boxboro, MA (US) 01719

( * ) Notice: Subject to any disclaimer, the term of this patent is extended or adjusted under 35 U.S.C. 154(b) by 0 days.

(21) Appl. No.: 11/057,309

(22) Filed: Feb. 11, 2005

Related U.S. Application Data

(60) Provisional application No. 60/630,998, filed on Nov. 24, 2004.

(51) Int. Cl.
*F02B 47/02* (2006.01)

(52) U.S. Cl. .................................................. 123/25 R

(58) Field of Classification Search ............. 123/25 J, 123/25 K, 25 L, 25 M, 25 N, 25 R, 25 A, 123/1 A, 668, 536
See application file for complete search history.

(56) References Cited

U.S. PATENT DOCUMENTS

| | | | |
|---|---|---|---|
| 3,537,829 A * | 11/1970 | Ott ............................. 48/189.3 |
| 3,681,896 A * | 8/1972 | Velkoff ......................... 96/27 |
| 4,355,969 A * | 10/1982 | Nelson et al. .................. 431/4 |
| 4,383,767 A * | 5/1983 | Jido ........................... 366/154.1 |
| 4,459,943 A * | 7/1984 | Goodman .................. 123/25 J |
| 4,630,169 A | 12/1986 | Kelly |
| 4,632,067 A * | 12/1986 | Carlson ..................... 123/25 A |
| 4,718,920 A * | 1/1988 | Kinsey et al. ................ 95/71 |
| 4,960,080 A * | 10/1990 | O'Neil et al. ............. 123/25 A |
| 4,991,774 A | 2/1991 | Kelly |
| 5,154,142 A * | 10/1992 | Kamo ...................... 123/25 F |
| 5,704,554 A | 1/1998 | Cooper |
| 5,765,761 A | 6/1998 | Law |
| 5,800,576 A * | 9/1998 | Johnson et al. ............... 44/301 |
| 6,082,311 A * | 7/2000 | Collin ....................... 123/25 R |
| 6,415,745 B1 * | 7/2002 | Hellen et al. ............. 123/25 R |
| 6,647,717 B2 * | 11/2003 | Zaslavsky et al. ............ 60/398 |

* cited by examiner

*Primary Examiner*—Stephen K. Cronin
*Assistant Examiner*—Hyder Ali
(74) *Attorney, Agent, or Firm*—Hamilton, Brook, Smith & Reynolds, P.C.

(57) ABSTRACT

Internal combustion engines generally suffer from inadequate time to completely combust all the fuel in a given cycle. Therefore, any method for increasing the rate and completion of combustion is welcomed. A large excess of electrons are admitted to the combustion zone attached to a fine water droplet spray. The charged spray enters through the air intake valves at the beginning of the intake stroke. The charged spray becomes well mixed with the charge of air prior to fuel injection and the well mixed electrons provide for catalytic action. Electron catalyzed combustion reactions occur faster and at lower temperatures. The lower temperature reduces NOx and the faster burning increases efficiency and reduces soot formation. The catalytic benefits of charged water fumigation is only observed once the electron concentration exceeds a threshold value.

9 Claims, 1 Drawing Sheet

CHARGED WATER FUMIGATION FOR COMBUSTION SYSTEMS

This application claims the benefit of provisional application No. 60/630,998 filed Nov. 24, 2004.

BACKGROUND OF THE INVENTION

Compression Ignition (CI) is the formal name for diesel engine operation. The history of compression ignition technology has generally lead to higher and higher injection pressure in within the fuel injector in order to enhance the mixing of diesel fuel and air in the cylinder. Prior to 1980 nearly all injector systems operated at pressure below about 2,000 psi. Today's systems can operate at pressures above 20,000 psi. These high pressure place severe demands on the fuel delivery system, but higher pressures allow for more fuel to be injected per unit time. As a result the injector may be opened and closed more than once during each compression cycle.

The high pressure thereby allows for some degree of shaping of the injected fuel by modulating the opening and closing sequence of the injector near top dead center (TDC) of the compression cycle.

Diesel fuel cannot be injected too far from top dead center because thorough mixing of fuel and air prior to achieving maximum pressure leads to preignition and detonation waves in the cylinder. Detonation is an undesirable reaction as shock waves are strong enough to damage the rings and piston crown. Therefore, the direct injection of diesel fuel must occur within a small number of crank angle degrees around TDC. At high speed this means that the time for fuel injection, droplet penetration, droplet evaporation, mixing with air, and finally deflagration type combustion must all occur in about one to two milliseconds.

Complete combustion is a challenge in this brief period and any process that can enhance any one of the aforementioned processes has merit for diesel technology. Herein, we detail a mechanism for increasing the reaction rate of the deflagration wave by means of a catalyst. The catalysts are electrostatically charged water droplets.

Fuel Considerations

Compression Ignition (CI) engines are diesel engines that can be instructively compared with Spark Ignited (SI) engines for the purposes of understanding the significance of this invention. SI engines are limited to low compression ratios (<~10:1) because the fuel is injected at the beginning of the compression stroke. The fuel has plenty of time to mix with air as the piston compresses the mixture over a period of 5-8 milliseconds. Therefore mixing and time are not as critical for spark ignited engines. Gasoline will spontaneously combust at high temperatures and pressures and explodes long before the piston has moved up to top dead center (TDC) when the compression ratio gets above about 8:1. This pre-ignition phenomenon leads to engine damage because pre-ignition invites shock waves rather than flame from progression. That is why SI engines with compression rations above 8:1 require high-octane fuels (>93 octane). Octane is a measure of the non-flammability of fuels. Higher octane numbers indicate that such fuels are hard to ignite without the application of a spark.

Unfortunately, the low compression ratio translates into low efficiency from a thermodynamic perspective. CI engines typically operate between 16:1 and 20:1 compression ratios. CI engines rely on igniting fuel droplets by thermal means. The fuel is qualified by a Cetane number, which is a measure of it flammability. Unlike gasoline CI engines benefit from fuels that ignite easily.

Gasoline and diesel fuels are nearly equal in energy concentration (42-44 MJoules/kg), but vary widely in their flammability. Liquid hydrocarbon fuels are a mixture of molecules with different bonding configurations. Gasoline consists of a distribution of molecular weight compounds with an average molecular content of eight carbon atoms and 18 hydrogen atoms per molecule. The average composition for diesel fuel is about twice as big a molecule at 16 carbons and 34 hydrogen atoms per molecule.

Straight chain molecules (aliphatic) burn most cleanly whereas aromatic compounds generally produce more soot. This is because the aromatics contain doubly bonded carbon atoms. The stronger bonds require more activation energy to decompose and this inevitably leads to soot production when pure aromatic molecules are burned in a diesel engine. It is widely reported that the aromatic fractions in diesel fuel are the soot precursors in the exhaust as well as the coke precursors in the injector holes.

This invention shows that the concentration of aromatic molecules in the liquid fuel can be decoupled from soot formation. This decoupling occurs as part of the subject invention of adding catalysts to the combustion zone.

Water and Internal Combustion Engines

Water has been employed in diesel combustion engines for decades. Water has been added in the form of steam aspirated into the air intake along with the charge of air. Water can also be directly injected into the cylinder as a high-pressure spray from a separate injection nozzle. Water has also been added as an emulsion and directly injected into the engine through a standard injector. All three approaches have resulted in a lowering of both NOx and soot in diesel exhaust. They have achieved these profiles as a result of an increase in the rate of reaction when water acts as a combustion catalyst. The term catalyst is an exact description of the process because water is imported into the combustion cylinder and allows for efficient combustion at reduced temperatures.

While the water does not add any net energy to the process per se; the increase in combustion rate makes more energetic molecules available to contribute thrust during the early stages of expansion. This early availability allows for more of the chemical energy to be converted to shaft work. This early availability is accompanied by more complete combustion so the soot production is curtailed.

Several combustion models suggest that water could act in a catalytic manner as a temporary source of oxygen during the fuel rich stage of combustion[1] in addition to the diluent effect on thermally derived NOx. The oxygenate component for water may ultimately explain much of the soot reduction observed by many of the water-assisted combustion experiments reported frequently in the literature[2,3].

This hypothesis suggests that distributing the water to the greatest possible extent could maximize the kinetics of this oxidative aspect of water in combustion. The very low emission profiles reported[4] in supercritical diesel operation are believed to evolve from specific structures that water adopts in the supercritical regime.

The concept of water as catalysts suggests consideration of methods for enhancing the catalytic activity of water. Reaction rates generally increase, as a function of temperature, so increasing the initial temperature of water in the engine was desirable. This author observed a clear example of this behavior in 2001 where water and diesel fuel were mixed, pressurized to 4,000 psi and heated to a supercritical temperature of 380° C. This supercritical mixture acted like a dense gas that, when injected into a diesel engine, combusted with greatly reduced soot and $NO_x$ profiles. The same kind of supercritical water/fuel mixture was applied to a turbine engine[5] in 2002 and even lower $NO_x$ and soot profiles were obtained.

The superior results of the supercritical combustion studies concurred with the water-as-catalyst concept. The combustion was faster and the water was very well distributed with the fuel. This is a central component of catalysis. The catalyst must be well distributed in order enhance the catalytic action. The complete intermixing of fuel and water as a distribution of maximum extent is achieved in the supercritical mixtures, but it is impractical for transient operation in CI engines. The supercritical studies simply serve to highlight the benefits of distributing water-as-catalyst to the maximum extent possible.

Quantum Energy Technologies Corp. personnel spent a great deal of effort on supercritical combustion. They had trouble sustaining operation, but when we the supercritical water/fuel mixtures were running on a Yanmar, single cylinder CI test engine they lowered both NOx and soot by over 90%. The instructive aspect of these experiments and the big lesson from this experience is that thoroughly mixed water vapor can have a great effect on combustion processes. The NOx lowering can be attributed to lowering of the combustion temperature. However, the soot reduction can only be explained via a catalytic mechanism. We were able to burn pure aliphatic compounds with no soot production at all. We even dissolved solid mothballs in Xylene and got a perfectly blue flame and no soot!

Quantum Energy Technologies Corp. (Cambridge Mass.) performed hundreds of nanoemulsion test runs on a well-instrumented diesel engine prior to bankruptcy in 2003. Soot and $NO_x$ were reduced to a greater extent than with macro emulsions (Gunnerman, Nev.), but the reductions were not as significant as the supercritical experiments. A comparison of these three water/fuel studies on CI engines confirms that the optimum emission reductions occur with the finest distribution of water.

This invention describes a technology that allows for water to be better distributed than a normal water injection spray (also know as water fumigation). Electrons are added to liquid water and the electrons promote finer sized spray particles than other spray techniques. Furthermore, the excess electron population allows the water clusters to catalyze combustion reactions at a faster rate.

Excess electron population inhabits delocalized molecular orbitals at the surface of the droplets. They reside in shallow potential wells and are easily incorporated in electron transfer reactions during combustion. An excess electron population optimizes the catalytic role of water in combustion to a point where it can compete with supercritical combustion technology.

Electrostatically Charged Water Sprays

Water can be electrostatically charged in a variety of ways. That is, a container of water can have a nonequilibrium electron population such that there is an excess or dearth of electrons. In this disclosure we will focus on water with an excess number of electrons. Adding electrons to liquid water changes its chemical and physical properties. For example, a 20 ppb concentration of excess electrons in water doubles the viscosity(6). The extra electrons reside in highly delocalized molecular orbitals that are bonding in character. Therefore, adding electrons to water stabilizes the basic structural units of water by adding to the net bonding. These water structures have been well described by MIT professor Keith Johnson in an article in the journal, Science in 1998.

Water is a unique liquid with a high specific heat that can absorb a large quantity of thermal energy per unit of temperature rise. This aspect of water enables lower temperatures in the cylinder by absorbing some of the peak energy release of the reactions. It is well known in combustion practice that $NO_x$ production is proportional to the temperature raised to the $5^{th}$ power (Zel'dovich Mechanism). This thermal energy absorption accounts for most of the $NO_x$ reductions commonly observed in water assisted combustion studies as the water reduces the peak temperatures in the cylinder.

Water in the form of icosahedral clusters containing 20 or 21 water molecules is the lowest energy geometric configuration. These clusters form and break apart at a rate of about one billion times per second, however once formed they survive for about 1,000 periods of large amplitude cluster vibrational modes. It is these large amplitude cluster modes that confer the catalytic action during combustion. Therefore, any process that can allow the water cluster lifetime to exceed the current nanosecond limit will benefit water-based catalysis. The excess electrons that populate delocalized bonding orbitals around the surface of the 20-molecule clusters fulfill this criterion. The extra electrons allow the clusters to remain intact and extend the lifetime of the icosahdral water clusters' lifetime by several orders of magnitude. When the water clusters remain intact the catalytic activity is extended.

Fortunately, equipment for adding electrons to water has been developed and optimized over the past 40 years. Professor S. Edward Law, Distinguished Professor of Engineering at U. of Georgia has developed such equipment for electron injection to water sprays for agriculture applications. His company (Electrostatic Spray Systems, Athens Ga.) sells $5 M worth of electrospray equipment every year to the agricultural and produce industry. The operation of water electrosprays are well known in the produce industry and the equipment used in this invention are well described in U.S. Pat. Nos. 5,765,761 and 5,704,554 both issued in 1998.

The electrostatic spray adds electrons to water via high voltage induction. The spray units disperse the droplets with an air-assist. Additionally, the droplets self-divide by a process known as 'Coulomb Shattering', leading to a sharp reduction in water droplet size(7). Very small water droplets result. The mean diameter of these charged water droplets is over a factor of five smaller than uncharged water droplets sprays.

Since the volume of each droplet is related to the cube of the droplet radius, the number of droplets increases by a factor of over 125 when the droplet diameter is so reduced. This size reduction by over two orders of magnitude means that the water-as-catalyst is more uniformly distributed in the combustion zone and more likely to affect combustion reactions.

Quantum Energy Technologies Corp (1996-2003) of Cambridge Mass. was formed to examine the role of water in combustion. It also performed experiments to examine the role of excess electrons on internal combustion. The knowledge gained in these studies has pointed to the value of this invention on combining electrons and water for diesel combustion. Experiments were performed on diesel, turbines and oil burners all operating on nanoemulsions and/or supercritical water/fuel mixtures.

Recently it has been reported that water added to the compression stage of a gas turbine can reduce the amount of energy needed to compress the air prior to entering the burner section[8]. This is another benefit for water in a combustion environment, but the use for the reduction emission of NOx via charged water fumigation has not been evaluated either theoretically or experimentally until this disclosure.

Electron Catalyzed Combustion

Catalysis has two main features;
1. It can accelerate slowly proceeding chemical reaction through the presence of a foreign substance.
2. It can reduce the activation barrier to combustion reactions to allow them to proceed at reduced temperatures.

Electrons would be disadvantageous to clean combustion if it caused the temperature of the reaction zone to rise. This happens when the electrons are added to the fuel and the combustion occurs close to the surface of each droplet as it evaporates. This is true because a 10 degree Kelvin rise in local temperature is sufficient to double the reaction rate in most thermally activated systems. Therefore the catalyst (electrons) must be well distributed with the temperature lowering medium (water) in order to conduct faster reactions without the concomitant rise in NOx production.

Nitrogen Oxide Formation during Combustion

Maximum formation of NOx occurs in combustion system when the temperature is at its peak and at an equivalence ratio between 0.8 and 1.0[10]. The most important factor affecting NO formation in gas turbines, for example, is flame temperature ($[NO_x] \propto \exp(0.009\ T)$)[11]; other important factors are residence time and oxygen concentration, and they are significant insofar as they affect flame temperature.

Modeling of NO formation by Bartok et al.[12] shows the effect of several variables:
higher residence times at higher temperatures yield higher NO.
maximum formation of NO occurs at 5% excess air, and NO levels drop off at 10% excess air.
increase of preheat temperature has dramatic effect by increasing NO.

Three mechanisms have been proposed to explain the formation of NO in combustion, which, although different, may operate concurrently:

High-Temperature Oxidation of Atmospheric Nitrogen: Thermal-NO

The role of nitrogen contained in the air in NO formation was initially postulated by Zeldovich[13]. In near-stoichiometric or lean systems the mechanism is the following:

  reac 1

  reac 2

  reac 3

In near-stoichiometric and fuel-rich mixtures, where the concentration of OH radicals can be high, the following reaction also takes place:

  reac 4 which, together with reactions 1, 2 and 3, is known as the extended Zeldovich mechanism.

The formation of NO via the Zeldovich mechanism is controlled by reaction 2 due to its very high activation energy (E=314 kJ/mol). For this reason thermal-$NO_X$ shows a strong exponential dependence on temperature. The contribution of thermal-NO to the total NO formation is small below 1,320° C. (Gupta[11]), but becomes very important above 1,400° C. Thus the peak flame or combustion temperatures are used as an indication of the importance of thermal-NO. An easy way to think of NOx formation in this temperature range close to 1400° C. is that the Formation is proportional to the absolute temperature raised to the fifth power!

Other factors which also affect $NO_X$ formation are fuel/air mixing processes (related to local levels of excess air), combustion intensity and pre-heating of the combustion air. Thermal-NO has also been shown to increase linearly with residence time.

The foregoing arguments suggest that combustion that avoids local hot spots and limits the time the hot spots exist above 1320° C. will produce less nitrogen oxides than standard combustion models.

Charged water fumigation lowers NOx by limiting the number of regions with hot spots by distributing the thermally absorbing water molecules. The electrons allow for combustion at leaner conditions so the flames can be stabilized at lower temperatures than without the excess electron population.

Electron Addition to Diesel Injection

In 1998 experiments were performed at Quantum Energy Corp to measure the effects of electron addition to diesel fuel at the point of injection. A 30,000-volt power supply was connected between the injector and the grounded cylinder head. The diesel fuel was injected through a time arc just in front of the injector tip.

This attempt at applying electrons to fuel was successfully achieved, but the result was an enormous failure. It had the exact opposite effect as anticipated. Soot and $NO_x$ levels increased dramatically and the specific fuel consumption increased with the application of a 30,000-volt potential between the injector tip and the grounded engine. Additionally, it burned out the electronics on the emissions equipment. That is the chief reason why the project was abandoned. We then reasoned that the polarity must have been wrong; at that time we believed that we were stripping electrons off the fuel rather than adding them. Both of those assumptions turned out to be inaccurate.

The soot and $NO_x$ increased and the efficiency decreased because the quantum chemistry was wrong. An examination of the molecular orbital topology of diesel fuel is not very different in character from water. The highest occupied molecular orbitals (HOMO) for liquid fuels are antibonding in character and the lowest unoccupied molecular orbitals (LUMO) are bonding in character. Therefore, both addition and subtraction of electrons from diesel fuel results in increased net bonding.

Extracting electrons from fuel droplets decreases the net amount of antibonding. As a result the net bonding between the fuel molecules increases makes them more difficult to evaporate. This results in a net increase in bonding, making it require more energy to break the bonds. Similarly, adding electrons populates the LUMO, which is bonding in character. This increase in the net bonding between fuel molecules effectively increases the boiling point of the liquid and increases it viscosity making it much harder to evaporate in the very short time allotted.

These molecular orbital considerations of altering the electron population of fuels explain the huge increase in soot we observed. The fuel droplets were unable to fully evaporate and mix with air. The droplet cores then become cenospheres for nucleating larger soot particles. Additionally, the increased density of soot particles causes internal reflections of thermal photons leading to higher temperatures and, consequently higher $NO_x$. Both of these features were observed in a series of experiments on a fully instrumented single cylinder diesel engine mated to a bench dynamometer. Additionally, the fuel consumption increased at constant speed and load, because the charged fuel was burning so ineffectively.

There have been numerous suggestions that electrostatic charging of diesel fuel would benefit diesel combustion. However the QET experiments combined with the quantum chemical analysis suggests that the polarity issue was moot, because both adding and subtracting electrons from fuel result in increased bonding between fuel molecules. Any electrostatic charging of diesel fuel is therefore not advised.

Electrostatic Charging of the Air Intake in a Diesel Engine

Jimmy L. Lee (Rohnert Park Calif.) performed electrostatic charging on the intake air of a diesel engine in the 1980s. Quantum Energy Technologies Corp. repeated these experiments using Lee's equipment in 1997. A 30,000-volt power supply was used along with small diameter (0.005" radius) tungsten cathode wires. Air passing over these energized wires became negatively charged. This charged air was fed into the air intake of a 1982 Mercedes 240D running at 55 mph on a chassis dynamometer. The results of 20 hours of such operation resulted in an efficiency gain of only 6%.

It was later learned that the electrostatic charging of the intake air was very sensitive to the engine grounding. A grounded engine neutralized 99% of the negative charge as compared with an ungrounded engine. Our first set of chassis dynamometer experiments were completed with the car engine grounded by steel chains. As a result, a series of highways driving at 55 mph on flat highways with insulating tires faired much better. The break specific fuel consumption (BSFC) improved by 15%.

These same kinds of experiments were repeated on highway driving in the San Joachim Valley, Calif. in August, 1997. A 1979 Volkswagen diesel powered pickup truck was driven at a constant 55 mph over level highway terrain. Once again, the negative charging of the air intake resulted in an efficiency gain of 15%. No emissions measurements were performed during this series of test.

The improvement in fuel consumption was again attributed to the improvement in quantum chemistry during combustion conditions. Air is largely composed of nitrogen and oxygen. Nitrogen has a low attachment crossection for electrons, so the majority of the electrons attach to the $O_2$ molecules. The electrons populate the lowest (energy) unoccupied molecular orbital available, which is a p-σ* antibonding orbital. Population of this orbital makes the oxygen less stably bound and thus more reactive. The increased reactivity enables the fuel to burn more quickly while the piston is near TDC. Consequently, more energetic molecules are available to be converted to shaft work.

Combining Electrostatic Charge and Water

It has been established experimentally that water is a method for reducing soot and $NO_x$. The experiments have shown that the biggest reductions come with the best distribution of water in the combustion chamber. There is little time for mixing the water with both the fuel and the air under diesel operation, so care must be taken when applying water.

Secondly, it was established that charging the fuel is not advised as either polarity results in a net increase in bonding between fuel molecules. Fuel cannot be combusted until it evaporates and comes into contact with oxygen and the charged fuel experiments verified the reduced evaporation rates for charged fuel droplets.

Thirdly, it was established that air assisted electrostatic spraying of water results in a better distribution of droplets than non-charged spray by over two orders of magnitude.

Fourthly, it was established that negatively charged intake air results in a fuel consumption benefit of 15%. These four experiments all point to a great benefit for electrostatic water sprays applied to the air intake of a diesel engine. The anticipated results are emissions reductions of both soot and $NO_x$ that is intermediate between nanoemulsions and supercritical combustion results. However, the fuel consumption benefit is expected to equal or exceed that of the Mercedes 240D and Volkswagen (Lee) experiments at 15% improvement in brake specific fuel consumption.

All of these studies suggest that delivering water in a fine mist will improve emission profiles. The data suggests that electron addition will improve the catalytic nature of water in the combustion zone. This should further reduce soot and it may even provide a fuel economy benefit.

SPECIFIC EMBODIMENT OF THE INVENTION

Water catalyzes combustion. Electrons likewise catalyze combustion for reasons related to the molecular orbital topologies important to reaction kinetics. Electrons and water combine to provide an improved environment for internal combustion.

Water is a low cost fluid that is readily available to be added to diesel fuel in quantities on the order of 10-50% of the fueling rate. Additionally, water is a superior solvent for other chemical species that would provide benefits to the combustion process. For example, urea can be dissolved in water and urea added to the exhaust has already been shown to reduce $NO_x$. Additionally, other combustion enhancement compounds such as amyl nitrate etc. can se solubilized and fumigated along with the negatively charged water.

Water must remain in liquid form to accrue the benefits already discussed; so freezing of water in cold climates must be anticipated. Ethanol addition is an immediate candidate to reduce the problems of ice formation. Fortunately, ethanol is also a strategic renewable energy source. Fumigation of alcohol/water mixtures along with electrons can provide efficiency benefits as well as emission reductions while at the same time reducing the dependence on foreign fuel supplies.

Charged water fumigation with dissolved alcohol will provide a significant energy benefit, because the alcohol is delivered at bottom dead center at the beginning of the compression stroke. It will be very well dispersed in the charge of air by the time the diesel fuel is injected near TDC. This will allow the alcohol to burn completely and more cleanly than it is when mixed with the diesel fuel.

BRIEF SUMMARY OF A PREFERRED EMBODIMENT OF THE INVENTION

A method of increasing efficiency and reducing emissions of a compression ignition engine having a combustion chamber and a piston, an air intake passageway for introducing air into said combustion chamber during a down stroke of the piston, a fuel injector, separate from said air intake passageway, for injecting fuel into the combustion chamber at the top of a compression stroke following the down stroke, the method comprises introducing a fine spray of negatively charged water droplets into the combustion chamber during the down stroke of the piston, the fine spray of water droplets having a negative charge density that is high enough to effectively produce an increase in engine efficiency.

The fine spray of negatively charged water droplets preferably have a negative charge density greater than 0.3 Coulombs/cubic meter and a mean diameter below 80 microns, and wherein the negatively charged water droplets have ethanol dissolved therein for freeze prevention while at the same time functioning as a strategically renewable energy source.

BRIEF DESCRIPTION OF THE DRAWING

The sole FIGURE schematically illustrates a cylinder of a conventional four stroke compression ignition diesel engine, the piston being at top dead center and a nozzle 10 for introducing a negatively charged fine spray of water droplets into an air intake passageway of the engine.

DETAILED DESCRIPTION OF THE INVENTION

Figure 1:
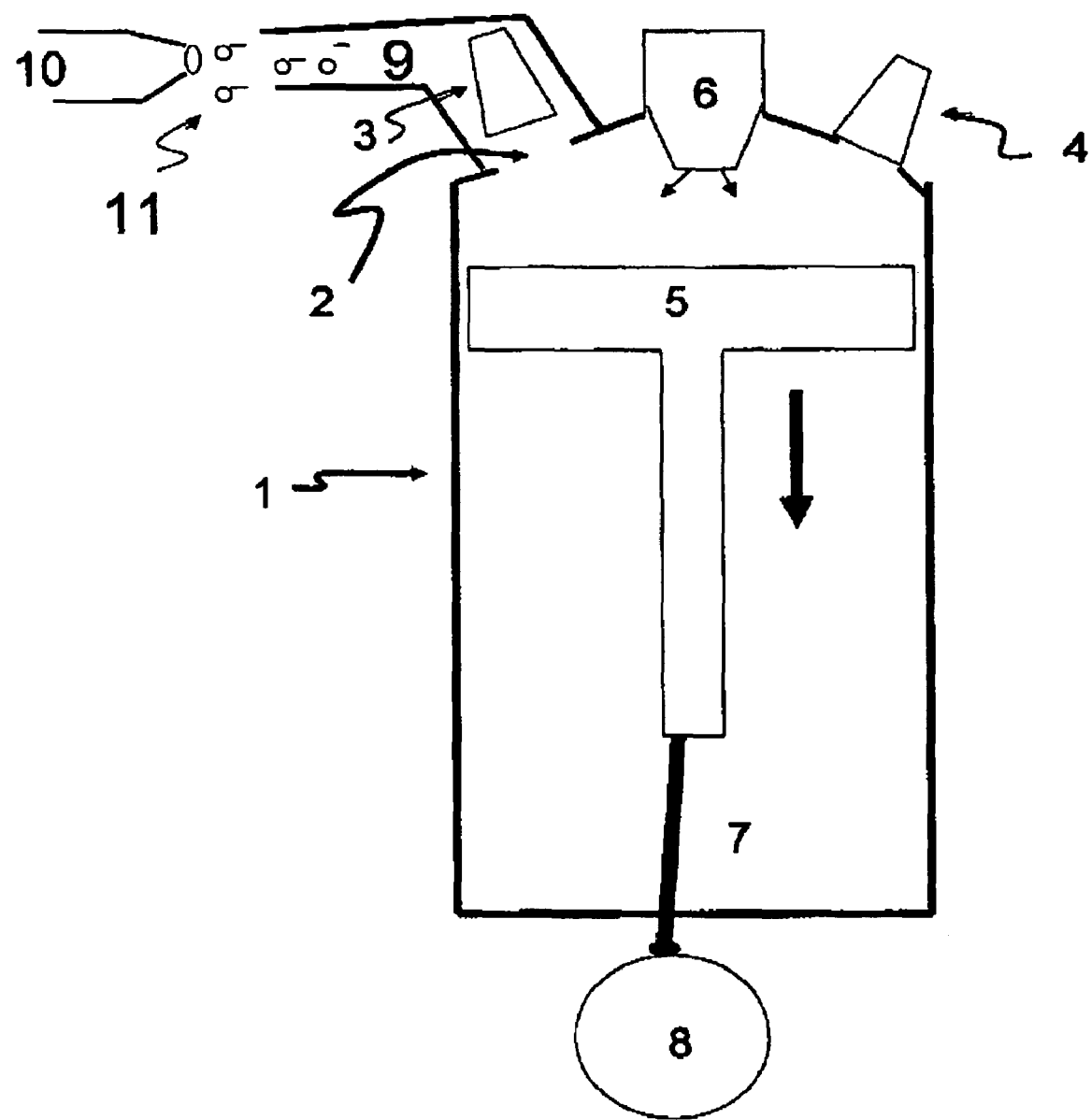

The operation of a conventional four stroke compression ignition engine is indicated in the sole FIGURE, FIG. 1. The piston 5 is connected by a rod 7 to a crank shaft 8. The crankshaft makes two full revolutions in the conventional four stroke operation of the engine.

The FIGURE includes a typical cylinder 1 and air intake port 2. Air intake valve 3 opens when the piston 5 is at top dead center (TDC). At the beginning of the air intake stroke the piston begins moving downward in the figure as indicated by arrow 5a. Note that the exhaust valve 4 is closed. Air along with negatively charged water droplets enter through inlet port 2 and mix together. An electrostatic spray delivery device 10 is positioned within the air intake passageway in accordance with the invention. Device 10 introduces a fine spray of negatively charged water droplets into air intake passageway 9 and is similar to devices mentioned earlier in U.S. Pat. Nos. 5,765,761 and 5,704,554 and which were sold by Electrostatic Spray Systems Corporation, Athens, Ga. The air intake manifold or passageway 9 and the back of the air intake valve 3 are coated with an electrically insulating layer to maximize the amount of electrons that enter the cylinder at the beginning of the air intake stroke. An anticorrosion coating is also added to prevent corrosion from excess water left in the engine between engine operations.

At the bottom of the air intake stroke, the air intake valve 3 is closed and piston 5 moves upward compressing the mixture of air and negatively charged water droplets. This compression causes the mixture to heat adiabatically to nearly 700 degrees Celsius. This heated mixture is sufficient to ignite filet when it is supplied by the fuel injector 6.

The Piston 5 arrives at TDC with both valves 3 and 4 closed. Fuel is injected by fuel injector 6 into the densely compressed and heated mixture of air and negatively charged water droplets. The water droplets, as a result, have largely evaporated and the negatively charged water molecules are very well homogenized with the air molecules. Fuel is added from a high pressure reservoir through fuel injector 6. The filet injector typically has multiple orifices to spray fuel droplets evenly throughout the reduced volume in the cylinder at TDC. Note that the fuel injector is completely separate from the air intake passageway as shown.

The fuel is ignited by the action of the hot gases and electrons in the air/water mixture. The combustion reactions release heat adding an increase in pressure to the piston 5 causing it to move downwardly. This is known as the expansion stroke, or alternatively, as the power stroke.

The piston 5 then reaches bottom dead center and the exhaust valve 4 opens. The piston moves upwardly and pushes the spent reaction products out through the exhaust port.

This description of the sole FIGURE is well known in the art except for the addition of a fine, negatively charged water spray device 10 separate from the fuel injector. The negatively charged water droplets (11) are directed by device 10 such as an electrostatic spray nozzle towards the air intake port 2 in the FIGURE. The negatively charged spray (11) is added after the air has passed through an air filter to remove particulate matter.

It is desirable to have a high density of electrons on each droplet, because the electrons move to the outer surface of each droplet and cause the droplets to shatter into smaller droplets by Coulomb repulsion forces. In turn, the smaller droplets provide a greater total surface area for evaporation and mixing.

The number of droplets is most useful when they are well distributed in the cylinder. They tend to mix completely and stay away from each other due to Coulomb repulsion between negatively charged droplets. The number of droplets increases by a factor of eight when the radius is reduced by a factor of 2. Therefore, the optimum operation employs the highest charge density achievable from the electrostatic spray delivery device 10.

Early Test Data

Experiment 1

October 2004

The 1977 Mercedes Benz 240D was mounted on a chassis dynamometer and tied down with nylon straps. The car engine is not grounded out as in the experiments conducted in 1997. The cruise control was not operational, so the fuel linkage was clamped at a given setting. Diesel fuel delivery was adjusted by this linkage to add more or less fuel to each injection event, so clamping the linkage insures that the same amount of fuel was delivered for each cylinder event.

The car was running at 38 miles per hour with a dynamometer load of 15.6 Horsepower. The fueling rate was determined by weighing the fuel in a Plastic reservoir every 5.0 minutes. The digital scale had a range of 10 Kilograms and an accuracy of 1 gram. The fueling rate under these operating conditions was 405 grams ±5 grams every 5.0 minutes. The variation in fueling rate, speed and load was less than 0.5% for a 1.5 hour observation period.

With the application of CWF on the chassis dynamometer at the laboratory of Combustion Electromagnetics Corp., (Prentiss Street, Arlington Mass.), the engine speed gradually increased and the dynamometer loading increased in response to the changes in combustion. The speed spontaneously increased from 38 mph to 51 mph and the dynamometer loading increased from 15.6 to 17.6 horsepower. This was a repeatable effect as the engine returned to 38 mph when the charged water spray was removed.

The fueling rate increased from 405 to 500 grams/5 minutes, because the increased speed equates with more combustion events per unit time. This is a 24% increase in fueling rate, but it is a 34% increase in the number of combustion events and an increased loading of 14%. Both of these factors suggest that the energy conversion of the fuel with charged water addition was significantly improved. It also suggests that the combustion was faster.

The $NO_x$ levels increased slightly, but the NOx levels are a strong function of the loading. The increased engine loading would have resulted in higher $NO_x$ levels. The $CO_2$ levels increased and the CO levels decreased with the charged water addition. This was unexpected, since water addition generally leads to enhanced CO production. The electron addition is clearly changing the reaction rates in the cylinder in a positive manner.

Experiment 2

A second experiment was performed with the fueling rate pinned at the same rate. As a result the engine ran at the same speed and load as in experiment 1 (38 mph and a load of 15.5 horsepower on the chassis dynamometer). The same water spray was applied to the air intake, but the charging circuit was removed and no electrons were added to the spray. The results were profoundly different from experiment 1.

The $NO_x$ levels decreased by 20%, but the engine speed and load remained constant at 38 mph and 15.5 hp loading. This second experiment shows that the electrons are directly responsible for the changes in combustion rate. Both experiments used the same amount of water fumigation, but the first one with electrons added caused a large increase in speed and torque.

Experiment 3

The cruise control was operational and the car was operated at 38 mph and a load of 13.5 horsepower. The charged spray was introduced through a 4 foot long section of PVC pipe that had a 90 degree bend that was mounted directly over the air intake.

The efficiency increased by about 3% and the NOx decreased by about 22%. This result suggested that too little charged water was getting into the engine, so a smaller diameter PVC delivery tube was employed. The smaller diameter feed tube allowed for more of the charged water to enter the air intake manifold, but the exact quantity was not measured.

Experiment 4

A 2.5" PVC tube with a 90 degree bend was mounted directly over the air intake. More electrified water was being directed into the engine than in experiment 3, but the exact quantity was not determined. With the increased water addition the $NO_x$ decreased by 53%, the soot decreased by over 90% and the efficiency increased by 11.3%.

The car was shut off after several hours running on the charged water spray and the emissions probe was withdrawn from the tailpipe. It normally has a matte black finish that has the texture of felt with a typical depth of about 0.010"-0.020". This matte black finish was no longer observed and a metallic sheen was instead observed. This qualitative observation suggests that the soot production has been reduced by an order of magnitude as compared to standard diesel operation. The soot production with the charged water spray had the same appearance as observed in the supercritical combustion experiments.

These results are desirable and repeatable, but they were conducted on an old indirect injection CI engine. Modern diesel engines employ direct fuel injection into the cylinder. The improvement in the rate of combustion should also be present in newer engines. The combination of experiments suggests that the greatest impact for charged water fumigation will come at the highest engine speeds. In particular, the 15% improvement in BSFC with charged air in 1997 occurred at 55 mph. The November 2004 data with charged water fumigation data was taken at 38 miles per hour. Comparing 11.3% efficiency gain at 55 mph equates to a 15% improvement at 55 mph if the process scales with increased engine speed as anticipated.

Our electrostatic water spray data suggests that a given charge of fuel can produce more torque for a given amount of fuel. This observation runs counter to the basic assumption of compression ignition engines where fuel rate determines torque exclusively. This current understanding has not had the benefit of fundamental changes in the reaction rates within the cylinder that is provided by the excess electron population and thorough water mixing as in the supercritical experiments.

Diesel engines vary in size, but the average piston speed is remarkably constant. Additionally, the length of the stroke and piston diameters are also found to have similar dimensions for optimal efficiency. As such, larger engines have longer connecting rods that rotate slower and thus have more time for mixing and complete combustion. Therefore, truck and automobiles operate at the higher rpm are the most severely challenged. The benefits of increased reaction rates will be most valued in the smaller, high speed engines.

Water and electrons have been shown separately to have a beneficial effect of CI combustion. The combination of electrons and a fine water spray were fumigated into an indirect injection Mercedes 240D CI engine and found to have significant benefits. The electrons and air atomization combine to reduce droplet size to such a small dimensions that the water becomes very well distributed within the cylinder at TDC.

Adding more charge will further reduce the droplet size and improve the distribution in the CI cylinder. Additionally, doubling the concentration of excess electrons will double the number of droplets and increase the rate of reaction catalysis. Optimizing the amount of charge and water concentration in the air intake of a CI engine will provide significant benefits for this prime mover technology.

Concerns for Use in Existing Engines

The stated invention intends to increase the efficiency of all existing and yet to be produced CI engines. The retrofit market will have to face some issues that charged water presents. Existing engines produce water and carbon dioxide in the combustion zone at high temperature and pressure. These vapors are admitted to the exhaust manifold where they are expelled. The high temperature of the gases generally prohibits recondensation.

The air intake and cylinder will have an excess of water vapor after stopping the engine unless the source of water is terminated moments before shutting off the engine. Water vapor left on such surfaces has been shown to produce rapid corrosion and concomitant destruction of engines.

Furthermore, the addition of excess charge may exacerbate such corrosion currents during and after operation, so some attention must be made to sacrificial anode technology to restrict the corrosion to surfaces that are not critical to engine function.

The additional flow of water vapor into the engine may also require a more substantial oil-water separation unit to separate water from oil in the crankcase. A fraction of the water vapor formed during combustion already makes its way past the piston rings and other seals to reach the crankcase. Those skilled in the art should be able to foresee and treat the anticipated problems with water addition to internal combustion.

Freezing of the water source is another obvious issue for CWF. Freezing of the water source would prohibit CWF operation in cold environments. Fortunately, the addition of ethanol and other alcohols can minimize this freezing problem, while at the same time effectively combusting a good source of renewable hydrocarbon fuel. Fumigated alcohol is particularly attractive because the alcohol will be well mixed prior to the piston coming to TDC. This could further enhance the speed and cleanliness of CI combustion. This would translate into better BSFC and lower NOx and Pm for the same energy content.

Other Combustion Systems

The benefits of CWF can be directly applied to burner in heating systems at any desired scale. For example, a home heating system firing on number 2 oil employs a simple fuel injector with multiple orifices. The fuel is sprayed into a firebox and is ignited by a spark plug. Most home burner systems have a high firing rate owing to the need to keep the orifices rather large in diameter to avoid plugging. As a result the heat exchangers must transfer a lot of heat in a small space.

The heat exchangers are challenged by the build up of soot and unburned hydrocarbons on the metallic tubes. The efficiency of heat transfer is inversely proportional to this insulating layer build up. A modern burner/heat exchanger system is typically around 80% when new. However, this rate degrades with soot build up.

CWF applied to the air intake manifold of a burner will improve the rate of combustion and sharply reduce the soot production. The same benefits will accrue to gas fired burner systems where unburned hydrocarbons form a gummy build up on the heat exchanger surfaces.

BIBLIOGRAPHY

1. Dec, J. Canaan, R., Tree, D, The Effect of Water-Emulsified Fuel on Diesel Soot Formation; presented 29 Mar. 2000 SAE San Francisco
2. Tsao, K., Wang, C., "Puffing and Microexplosion Phenomena of Water Emulsion Fuels" SAE 860304
3. Subramanian, K., Ramesh, A. "Experimental Investigation on the Use of Water Diesel Emulsions with Oxygen Enriched Air in a Diesel Engine" SAE 2001-01-0207
4. Ahern, B. et al "Dramatic Emissions reductions with a Direct Injection Diesel Engine Burning Supercritical Fuel/Water Mixtures" SAE2001-01-3526
5. ASME turboexpo 2002, June, Amsterdam Netherlands Paper #2002-GT-30587; Low Emission Combustion Turbine Experiments with Supercritical Fuels, Haldeman, C. Ahern, B. et al (unpublished presentation)
6. Ahern, B. Experiments performed at QET laboratory, Cambridge Mass.,
7. Kelly, Arnold, J. U.S. Pat. No. 6,474,573, Nov. 5, 2002 "Electrostatic Atomizers"
8. Zheng, Q. et al, "Thermodynamic Analyses of Wet Compression Process in the Compressor of a Gas Turbine", ASME Turbo Expo 2002, June 3-6, Amsterdam, Netherlands, GT-2002-30590
9. Johnson, K., Slater, J. "Catalysis", Physics Today, 1974 . . . .
10. Sawyer R. F., Starkman E. S. 1968. Gas Turbine Exhaust Emissions. *Society of Automotive Engineers paper no.* 680462, 1-8.
11. Gupta A. K., Lilley D. G., 1992. Review: The Environmental Challenge of Gas Turbines. *Journal of The Institute of Energy*, 65, 106-117.
12. Bartok W., Crawford A. R., Skopp A., 1971. Control of $NO_X$ Emissions from Stationary Sources. *Chemical Engineering Progress*, 67, no. 2, 64-72.
13. Zeldovich Y. 1947. The Oxidation of Nitrogen in Combustion and Explosions. *Acta Physicochimica USSR*, 21, no 4, 577-628.

What is claimed is:

1. A method of increasing efficiency and reducing emissions of a compression ignition engine having an air intake passageway and a fuel injector separate from said air intake passageway comprising introducing water droplets, predominately of negatively charged water, through said air intake passageway of said compression ignition engine, enabling the water droplets to arrive at the bottom of a compression stroke, said water droplets having a negative charge density that is high enough to effectively produce an increase in engine efficiency.

2. The method of claim 1 wherein said water droplets have a negative charge density of greater than 0.3 Coulombs/cubic meter.

3. The method of claim 2 wherein said water droplets have a mean diameter below 80 microns.

4. The method of claim 3 wherein said water droplets have alcohol dissolved therein.

5. The method of claim 4 wherein said alcohol is ethanol.

6. The method of claim 1 wherein said water droplets have alcohol dissolved therein.

7. The method of claim 6 wherein said alcohol is ethanol.

8. A method of increasing efficiency and reducing emissions of a compression ignition engine having a combustion chamber and a piston, an air intake passageway for introducing air into said combustion chamber during a down stroke of said piston, a fuel injector, separate from said air intake passageway, for injecting fuel into said combustion chamber at the top of a compression stroke following said down stroke, said method comprising introducing a fine spray of water droplets predominately of negatively charged water into said combustion chamber during said down stroke of said piston and wherein said negatively charged water droplets have a negative charge density greater than 0.3 Coulombs/cubic meter and wherein said negatively charged water droplets have a mean particle size below 80 microns.

9. The method of claim 8 wherein said negatively charged water droplets have ethanol dissolved therein.

* * * * *